United States Patent
Obenaus

(10) Patent No.: US 8,839,758 B2
(45) Date of Patent: Sep. 23, 2014

(54) INTERNAL COMBUSTION ENGINE COMPRISING A CONNECTING ASSEMBLY FOR A CYLINDER HEAD

(75) Inventor: Thomas Obenaus, Fernitz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 13/580,279

(22) PCT Filed: Mar. 14, 2011

(86) PCT No.: PCT/EP2011/053797
§ 371 (c)(1),
(2), (4) Date: Aug. 21, 2012

(87) PCT Pub. No.: WO2011/113793
PCT Pub. Date: Sep. 22, 2011

(65) Prior Publication Data
US 2012/0318229 A1 Dec. 20, 2012

(30) Foreign Application Priority Data

Mar. 18, 2010 (AT) .................................. A 440/2010
Feb. 24, 2011 (AT) .................................. A 249/2011

(51) Int. Cl.
F02F 11/00 (2006.01)
F02F 1/42 (2006.01)
F01N 13/18 (2010.01)
F01N 13/10 (2010.01)
F02B 67/10 (2006.01)
F02B 37/00 (2006.01)

(52) U.S. Cl.
CPC ................. F02F 1/42 (2013.01); F02F 1/4264 (2013.01); F01N 13/1816 (2013.01); F01N 13/10 (2013.01); F02B 67/10 (2013.01); F01N 13/1805 (2013.01); F01N 13/1827 (2013.01); Y02T 10/144 (2013.01); F02B 37/00 (2013.01)

USPC ............... 123/193.3; 123/195 A; 123/184.55; 181/207; 181/209

(58) Field of Classification Search
USPC ................. 123/193.3, 195 R, 195 A, 184.55; 60/322, 323; 180/309; 181/207, 208, 181/209
See application file for complete search history.

(56) References Cited

U.S. PATENT DOCUMENTS 3,941,409 A * 3/1976 Rameau ...................... 285/124.4
4,183,344 A * 1/1980 Kirchweger et al. ..... 123/198 E
(Continued)

FOREIGN PATENT DOCUMENTS

DE 2331510 9/1974
DE 4205454 8/1993
(Continued)

OTHER PUBLICATIONS

Machine translation, Description of DE202005018602, obtained from espacenet.com, pp. 1-4.*
(Continued)

*Primary Examiner* — Noah Kamen
*Assistant Examiner* — Grant Moubry
(74) *Attorney, Agent, or Firm* — Dykema Gossett PLLC

(57) ABSTRACT

An internal combustion engine having a connecting assembly for a cylinder head (2) includes at least one air- or gas-conducting part (4) that connects to at least one flow opening (3a) of the cylinder (2), in particular an exhaust manifold (5) or an intake manifold, and a sealing element (9) disposed between the air- or gas-conducting part (4) and the cylinder head (2). In order to reduce the assembly complexity and save installation space, at least one fastening means (7) for the air- or gas-conducting part (4) is disposed spatially separate from the sealing element (9).

15 Claims, 1 Drawing Sheet

(56) References Cited

U.S. PATENT DOCUMENTS

| | | | |
|---|---|---|---|
| 4,659,117 A * | 4/1987 | Holzhausen et al. | 285/49 |
| 5,918,912 A | 7/1999 | Keifel et al. | |
| 6,032,463 A * | 3/2000 | Bock | 60/323 |
| 6,702,062 B2 * | 3/2004 | Kusabiraki et al. | 181/240 |
| 6,752,113 B2 * | 6/2004 | Vichinsky | 123/184.21 |
| 7,185,490 B2 | 3/2007 | Smatloch et al. | |
| 7,921,963 B2 * | 4/2011 | Ishizuka et al. | 181/229 |
| 8,104,273 B2 * | 1/2012 | Barrieu et al. | 60/323 |
| 2002/0059795 A1 * | 5/2002 | Durr et al. | 60/323 |
| 2003/0057013 A1 * | 3/2003 | Uegane et al. | 181/207 |
| 2006/0017206 A1 * | 1/2006 | Steenackers | 267/148 |
| 2009/0113884 A1 * | 5/2009 | Leseman et al. | 60/323 |
| 2010/0078933 A1 | 4/2010 | Stemmer | |
| 2010/0223911 A1 * | 9/2010 | Gockel et al. | 60/280 |
| 2011/0016859 A1 * | 1/2011 | Schumnig | 60/323 |
| 2011/0107753 A1 | 5/2011 | Leroy et al. | |

FOREIGN PATENT DOCUMENTS

| | | |
|---|---|---|
| DE | 4430339 | 2/1996 |
| DE | 19510718 | 9/1996 |
| DE | 10063474 | 7/2002 |
| DE | 10251771 | 6/2004 |
| DE | 102004037865 | 3/2006 |
| DE | 202005018602 | 5/2007 |
| DE | 102008029020 | 12/2009 |
| FR | 2574475 | 6/1986 |
| WO | 2009003668 | 1/2009 |

OTHER PUBLICATIONS

English Abstract DE102008029020.
English Abstract of DE102004037865.
English Abstract of DE10251771.
English Abstract of DE4430339.
English Abstract of DE19510718.
English Abstract of DE4205454.
English Abstract of FR2574475.
English Abstract of DE10063474.

* cited by examiner

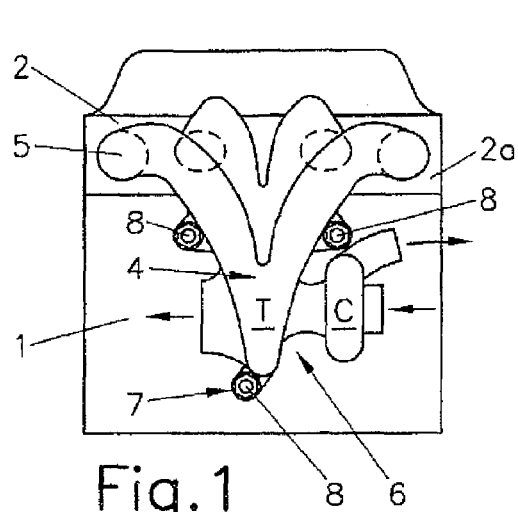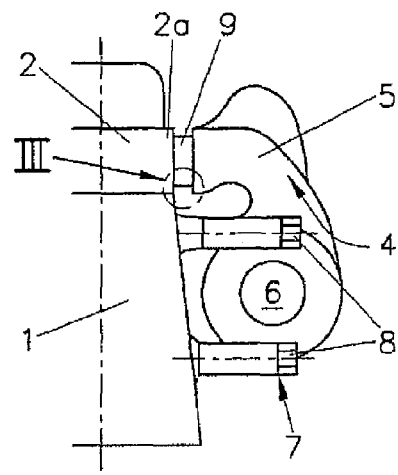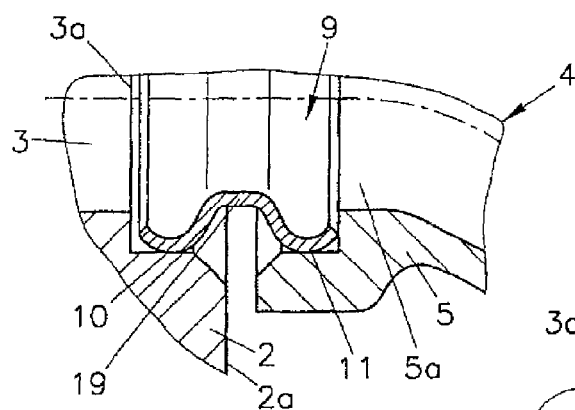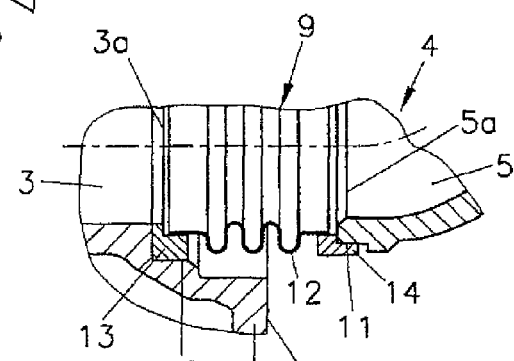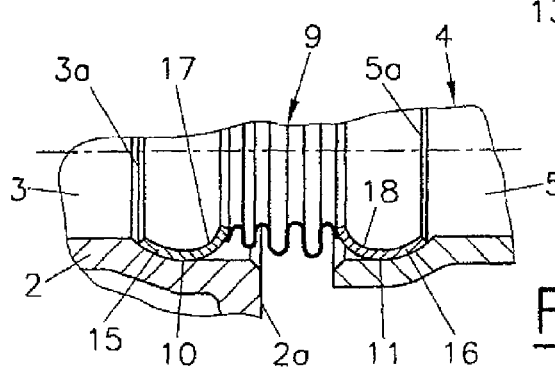

INTERNAL COMBUSTION ENGINE COMPRISING A CONNECTING ASSEMBLY FOR A CYLINDER HEAD

BACKGROUND OF THE INVENTION

1 Field of the Invention

The invention relates to an internal combustion engine having connecting assembly for a cylinder head, and including at least one air- or gas-conducting part connected to at least one flow opening of the cylinder head, especially an exhaust manifold or an intake manifold, with at least one sealing element being disposed between the air- or exhaust-gas-conducting part and the cylinder head.

2 The Prior Art

Intake or exhaust manifolds are usually fastened by means of screws or clamping apparatuses to the cylinder head, with at least one screw or clamping apparatus being provided per channel opening or component to be fastened. These screws or clamping apparatuses are mostly arranged in direct vicinity to the channel openings in order to generate the respectively high pressing forces under mostly limited component stiffness of the intake or exhaust manifold, which pressing forces are usually required by the seal installed between the two components to be connected. This strongly limits the freedom of construction because the screws for installing or removing the intake and exhaust manifold need to be accessible. As a result of the required screw clearances and the workspace for applying the tool, the overall space for placing the further required components and the design freedom of the components to be installed will be influenced disadvantageously.

DE 10 2008 029 020 A1 describes an internal combustion engine, comprising a cylinder head having an integrated exhaust manifold, on which an exhaust-conducting unit is mounted by means of a clamping flange apparatus, with the clamping flange apparatus comprising a cylinder flange associated with the cylinder head and a unit flange associated with the unit, with the flanges being pressed against one another in the direction of the flange plane. In order to achieve this, at least one clamping bridge is provided which is mounted in the direction of the flange plane, engages beyond the cylinder flange and the unit flange and acts by at least one bevel in a clamping manner on the two flanges. The clamping bridge is directly screwed together with the cylinder head via screws.

It is disadvantageous that threaded bores need to be provided on the cylinder head, which increases the production effort on the one hand and limits the freedom of design on the water cooling jacket on the other hand.

Further clamping solutions for fastening exhaust manifolds to cylinder heads are known from the publications of DE 10 2007 002 825 A1, WO 09/003668 A1, DE 10 2004 010 815 A1, DE 10 2004 037 865 A1, DE 102 51 771 A1, DE 44 30 339 A1, DE 195 10 718 A1, DE 196 53 908 A1, DE 42 05 454 A1 or DE 23 31 510 A1. In most of these solutions, screws are provided for fastening however and a relatively large amount of mounting space is required.

It is the object of the invention to avoid these disadvantages and to develop an alternative possibility for fastening for an air-or gas-conducting part connected to the cylinder head, with which the mounting effort and the required space can be reduced.

SUMMARY OF THE INVENTION

This is achieved in accordance with the invention in such a way that at least one fastening device for the air- or gas-conducting part is disposed spatially separate from the sealing element, with preferably the air- or gas-conducting part only being fastened to the cylinder block. It is also possible to fasten the air- or gas-conducting part only to the cylinder head or partly to the cylinder block and partly to the cylinder head.

The fastening device can also be arranged in a functionally separate manner from the sealing element.

Only relatively low clamping forces are required as a result of the deformation of the sealing element, the cylinder head and the air- or gas-conducting part.

The air- or gas-conducting part is preferably only connected by at least one sealing element with the cylinder head. An exhaust manifold or intake manifold forming the air- or gas-conducting part is therefore only fastened to the cylinder block, e.g. screwed onto the same. The air- or gas-conducting part can be formed by an exhaust manifold for example which is fixedly connected to a housing of an exhaust gas turbocharger or it can consist integrally of one part jointly with said turbocharger, with the exhaust manifold and the exhaust gas turbocharger being jointly fastened to the cylinder block.

A flexible sealing element is preferably arranged between the cylinder head and the air- or gas-conducting part. The sealing element can be arranged either integrally or in several parts and can be arranged at least in sections as a bellows and/or can have the shape of a spherical segment or a cylinder at least in sections in the connecting region of the cylinder head or the air- or gas-conducting part in the region of at least one outer jacket surface.

If the sealing element is arranged in several parts, it may comprise a tubular bellows part between the spherical segment parts or between annular parts in the connecting region, with the three parts being permanently connected with one another in a gas-tight manner, e.g. glued, soldered or welded. Each sealing element is connected in the connecting regions to the cylinder head and/or the air- or gas-conducting part, e.g. pressed in. The spherical segment shape is arranged in such a way that the sealing function is supported by the gas force within the exhaust manifold.

As a result of the connecting arrangement in accordance with the invention, reliability and durability can be increased and a flow-promoting configuration of the gas-conducting channels can be achieved in combination with low development risk. The spatial and functional separation of the sealing element and the fastening means allows fastening close to a vibration-sensitive turbocharger.

BRIEF DESCRIPTION OF THE DRAWINGS

The invention will be explained in greater detail below by reference to the drawings, wherein:

FIG. 1 shows an internal combustion engine in accordance with the invention in a side view;

FIG. 2 shows the internal combustion engine of FIG. 1 in a front view;

FIG. 3 shows a sealing element according to detail III in FIG. 2 in a first embodiment;

FIG. 4 shows a sealing element according to detail III in FIG. 2 in a second embodiment, and FIG. 5 shows a sealing element according to detail HI in FIG. 2 in a third embodiment of the invention.

DETAILED DESCRIPTION OF THE PREFERRED EMBODIMENTS

Functionally identical parts are provided in the embodiments with the same reference numerals.

FIGS. 1 and 2 show an internal combustion engine with a cylinder block 1 and a cylinder head 2. The cylinder head 2 comprises several gas exchange ports 3 which are shown in FIGS. 3 to 5 and which open into or originate from flow openings 3a in a region of a longitudinal side 2a of the cylinder head 2. The gas exchange ports 3 can be intake ports or exhaust ports. In the present embodiment, the gas exchange ports are formed by exhaust ports. An air- or gas-conducting part 4 is connected to the gas exchange ports 3, which air- or gas-conducting part which can be formed by a collector, either an intake manifold or an exhaust manifold, or a connecting unit such as a turbocharger. The air- or gas-conducting part 4 is formed in the present example by an exhaust manifold 5 which is rigidly connected to the housing of an exhaust turbocharger 6 or is integrally arranged with the same. Reference numeral T designates an exhaust gas turbine and reference numeral C designates a charger of the exhaust gas turbocharger 6.

The exhaust manifold 5 is fixed by means of fastening means 7 such as fastening screws 8 only to the cylinder block 1. There is no fixing of the exhaust manifold 5 to the cylinder head 2. This configuration leads to the effect that the exhaust manifold 5 is connected to the gas exchange ports 3 via a flexible or a flexibly movable installed rigid sealing element 9. Such a flexibly acting sealing element 9 is shown in FIG. 3 to FIG. 5 in various embodiments. The relevant aspect is that the sealing element 9 is capable of compensating relative movements between the cylinder head 2 and the exhaust port 5. The sealing element 9 can have the shape of a spherical segment or a torus at least in part.

FIG. 3 shows an integral sealing element 9 which comprises connecting regions 10, 11 at both ends which are arranged in the shape of spherical segments and between which a bellows 19 can be arranged. The sealing element 9 is inserted into the flow opening 3a, 5a by means of slight press fit. The spherical segment shape enables axial, radial and annular displacements to be absorbed by the sealing element 9.

FIG. 4 and FIG. 5 show sealing elements 9 which are assembled from three parts in a gas-tight manner. In FIG. 4 the sealing element 9 consists of a middle bellows part 12 and two ring parts 13, 14 in the connecting regions 10, 11 for connecting the sealing element 9 to the cylinder head 2 and the exhaust manifold 5. The ring parts 13, 14 are pressed in a permanent and gas-tight manner on the one hand into the cylinder head 2 and on the other hand onto the exhaust manifold 5. In the embodiment as shown in FIG. 5, the spherical segment parts 15, 16 are pressed in the connecting regions 10, 11 against spherical machined areas 17, 18 in the cylinder head 2 or the exhaust manifold 5. The spherical shape is arranged in such a way that the sealing function is supported by gas force within the exhaust manifold 5.

The relevant aspect is that the sealing and fastening function of the exhaust manifold 5 are separated from one another. The exhaust manifold 5 can therefore be fastened remote from the sealing element 9 between the exhaust manifold 5 and the cylinder head 2 by at least one fastening means 7, with the screw force generated for fastening the exhaust manifold not playing any role for generating the required sealing pressing. The sealing pressing of the sealing element 9 will be defined alone by the shape, function and/or size of the seal or the space predefined by said seal. The seal must be able to absorb and/or compensate all respective thermal deformations and displacements and/or those caused by vibrations.

By decoupling the fastening and sealing function, the behavior of the exhaust manifold 5 concerning thermomechanical fatigue strength can be improved. This leads to reduced formation of cracks because the exhaust manifolds are able to move freely with respect to each other close to the cylinder head.

Furthermore, the fastening screws 8 can be moved to areas where they are easily accessible without influencing the flow-promoting shape of the exhaust manifold 5. In particular, the overall unit consisting of exhaust manifold 5 and exhaust gas turbocharger 6 can be mounted in one work step. Furthermore, the fastening screws 8 can be placed in a region of the centre of gravity of the exhaust gas system and/or the turbocharger in order to minimize excitations for vibrations, without requiring any additional optionally required supports.

The invention claimed is:

1. An internal combustion engine comprising:
a cylinder block,
a cylinder head defining at least one flow opening,
a connecting assembly including at least one air- or gas-conducting part connected to said at least one flow opening of the cylinder head,
at least one flexible or flexibly moveable installed sealing element disposed between the air- or gas-conducting part and the cylinder head, and
at least one fastening means connecting the air- or gas-conducting part to the cylinder block and spatially separated from the at least one sealing element, wherein the air- or gas-conducting part is connected only by said at least one sealing element to the cylinder head and is exclusively fastened to said cylinder block, and wherein said at least one fastening means is arranged in a functionally separate manner from the at least one sealing element, so that the sealing element is capable of compensating relative movements between the cylinder head and the air- or gas-conducting part.

2. The internal combustion engine according to claim 1, wherein said at least one fastening means comprises a screw.

3. The internal combustion engine according to claim 1, wherein the sealing element is arranged flexibly and/or is flexibly connected to the cylinder head or the air- or gas-conducting part.

4. The internal combustion engine according to claim 1, wherein said at least one sealing element comprises a bellows section.

5. The internal combustion engine according to claim 1, wherein in a region of at least one outer jacket surface, the sealing element has the shape of a spherical segment or a cylinder at least in sections in the area of at least one connecting region of the air- or gas-conducting part or the cylinder head.

6. The internal combustion engine according to claim 1, wherein the at least one sealing element is one piece.

7. The internal combustion engine according to claim 1, wherein the at least one sealing element comprises several parts.

8. The internal combustion engine according to claim 7, wherein at least one part of the at least one sealing element comprises a bellows part.

9. The internal combustion engine according to claim 7, wherein at least one part of the at least one sealing element comprises a spherical segment part.

10. The internal combustion engine according to claim 7, wherein at least one part of the at least one sealing element comprises an annular part.

11. The internal combustion engine according to claim 7, wherein the several parts of the at least one sealing element are permanently connected to each other in a gas-tight manner.

12. Then internal combustion engine according to claim 7, wherein said at least one sealing element is pressed into a flow opening of the cylinder head and/or the air- or gas-conducting part.

13. The internal combustion engine according to claim 7, wherein said at least one sealing element is pressed onto the air- or gas-conducting part.

14. The internal combustion engine according to claim 1, including an exhaust gas turbocharger with a housing, and where the air- or gas-conducting part comprises an exhaust manifold which is rigidly connected with said housing of the exhaust gas turbocharger or is integrally arranged with said turbocharger, and the exhaust manifold and the exhaust gas turbocharger are jointly fastened to the cylinder block.

15. The internal combustion engine according to claim 1, wherein the air- or gas-conducting part comprises an exhaust manifold or an intake manifold.

* * * * *